United States Patent
Kennedy

(10) Patent No.: US 11,137,088 B2
(45) Date of Patent: Oct. 5, 2021

(54) LOCKING WRENCH FOR FIRE HYDRANT

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 36 days.

(21) Appl. No.: 16/241,298

(22) Filed: Jan. 7, 2019

(65) Prior Publication Data

US 2020/0217431 A1 Jul. 9, 2020

(51) Int. Cl.
*E03B 9/06* (2006.01)
*F16K 35/06* (2006.01)
*E05B 67/38* (2006.01)

(52) U.S. Cl.
CPC .............. *F16K 35/06* (2013.01); *E03B 9/06* (2013.01); *E05B 67/383* (2013.01)

(58) Field of Classification Search
None
See application file for complete search history.

(56) References Cited

U.S. PATENT DOCUMENTS

| | | |
|---|---|---|
| 1,197,614 A | 9/1916 | Duboish |
| 1,705,470 A | 3/1929 | Chirpe |
| 3,453,897 A | 7/1969 | Adnolfi |
| 3,532,109 A | 10/1970 | Smith |
| 3,539,877 A | 11/1970 | Davies |
| 3,554,160 A * | 1/1971 | Fortune ............... F16K 37/0008 116/277 |
| 3,556,131 A | 1/1971 | Diaz |
| 3,709,249 A | 6/1973 | Diaz |
| 3,840,041 A | 10/1974 | McMurray |
| 3,914,966 A | 10/1975 | Bello |
| 3,929,152 A | 12/1975 | Graham |
| 4,033,372 A | 7/1977 | Bowman |
| 4,182,361 A | 1/1980 | Oakey |
| 4,379,469 A | 4/1983 | Britz |
| 4,526,193 A | 7/1985 | Drach |
| 4,554,944 A | 11/1985 | Daghe et al. |

(Continued)

FOREIGN PATENT DOCUMENTS

WO 1999051903 A2 12/1999

OTHER PUBLICATIONS

Mueller Canada, Installation Instruction Manual, http://catalog.muellercompany.com/viewdocument.ashx?=6547&t=d, pp. 2-3.

*Primary Examiner* — Paul J Gray
(74) *Attorney, Agent, or Firm* — Brown & Michaels, PC

(57) ABSTRACT

A wrench for securing, actuating and preventing tampering with a fire hydrant is disclosed. In useful embodiments, the wrench can be a two-ended wrench having a loop that encloses a pentagonal opening at either end of an elongated handle, where the handle can include in a nonterminal portion a slot. In a locking mode, the wrench can accept at a first end an actuating nut of the fire hydrant and can be locked in place by inserting a locking arm of a padlock through an eye bolt that is secured to a side of the fire hydrant and inserted through the slot. The wrench can be unlocked and removed, whereupon a second end can be used to turn the actuating nut as well as to remove water outlet caps and adjust nozzles.

16 Claims, 4 Drawing Sheets

(56) References Cited

U.S. PATENT DOCUMENTS

| | | |
|---|---|---|
| 4,566,481 A | 1/1986 | Leopold, Jr. et al. |
| 4,620,428 A | 11/1986 | Kopesky |
| 4,651,771 A | 3/1987 | Borenstein et al. |
| 4,690,019 A | 9/1987 | Daghe et al. |
| 4,716,922 A | 1/1988 | Camp |
| 4,736,765 A * | 4/1988 | Campbell ................ E03B 9/06 |
| | | 137/296 |
| 4,842,008 A | 6/1989 | Avelli et al. |
| 5,033,501 A | 7/1991 | Stehling |
| 5,205,312 A | 8/1993 | Jerman et al. |
| 5,255,576 A | 10/1993 | Keith |
| 5,383,495 A | 1/1995 | Kennedy |
| 5,588,460 A | 12/1996 | Meneses |
| 5,727,590 A | 2/1998 | Julicher et al. |
| 6,089,253 A | 7/2000 | Stehling et al. |
| 6,112,761 A | 9/2000 | Scotto |
| 6,220,124 B1 | 4/2001 | Perkins |
| 6,688,326 B1 | 2/2004 | Sigelkis |
| 6,691,732 B2 | 2/2004 | Fleury, Jr. et al. |
| 6,816,072 B2 | 11/2004 | Zoratti |
| 6,901,950 B1 | 6/2005 | Burt et al. |
| 6,994,106 B1 | 2/2006 | Hackley et al. |
| 7,040,342 B1 | 5/2006 | Stehling et al. |
| 8,602,338 B2 | 12/2013 | Stone |
| 8,967,184 B2 | 3/2015 | Sigelakis et al. |
| 9,108,076 B2 | 8/2015 | Sigelaksis |
| 9,649,752 B1 | 5/2017 | Garrison |
| 10,480,680 B2 * | 11/2019 | McCartney ........... E05B 67/383 |
| 2007/0028967 A1 | 2/2007 | Scobie et al. |
| 2009/0301571 A1 | 12/2009 | Ruhs |
| 2015/0308083 A1 * | 10/2015 | Qingwei ................ F16K 3/314 |
| | | 137/556 |

\* cited by examiner

LOCKING WRENCH FOR FIRE HYDRANT

BACKGROUND OF THE INVENTION

Field of the Invention

The invention relates to fire hydrant security. More particularly, the invention pertains to a wrench configured to open and close a main valve of a fire hydrant and to lock the main valve of the fire hydrant from opening or closing.

Description of the Related Art

Fire hydrant networks are a vital tool for public safety officials, and municipalities recognize the importance of keeping them in good working order by preventing vandals from activating them. Fire hydrant tampering incidents cause significant problems. The negative consequences of unpermitted use of fire hydrants for non-emergency related purposes, such as summer recreation or cooling, include the waste of large amounts of treated drinking water, causing water pressure reductions that may hinder firefighting in the event of a fire, causing damage to a fire hydrant that may in turn cause firefighters to waste time and money, causing the municipal water supply to become discolored, causing expensive water damage to streets, sidewalks and private property, causing traffic and safety problems by flooding streets, and causing the possibility of injuring passersby directly by launching fire hydrant caps as projectiles or by hitting passersby with forceful water streams.

Over the years, numerous patents have described tools of various designs for actuating the opening and closing of fire hydrant valves, and many of them have included antitampering features in their designs. See, e.g., Daghe, et al., Operating wrench for tamperproof hydrants, U.S. Pat. No. 4,554,944A; Meneses, Fire hydrant valve guide with locking sleeve and wrench therefor, U.S. Pat. No. 5,588,460A; Burt, et al., Fire hydrant locking device, U.S. Pat. No. 6,901,950B1; Oakey, Fire hydrant protection device, U.S. Pat. No. 4,182,361A.

Such anti-tampering devices have exhibited various disadvantages. Some introduce considerable mechanical complexity to the fire hydrants. Many of them require firefighters to have access to a special tool and render common tools such as conventional wrenches useless for actuating the hydrants. Some make use of sensors coupled to a transmitter that may function to summon law enforcement after tampering has taken place, offering no preventive value and requiring maintenance of a power source. Zoratti, Fire hydrant anti-tamper device, U.S. Pat. No. 6,816,072B2. One scheme would require firefighters to carry a special magnetic wrench, which would be susceptible to failure if the magnetism in the wrench were to degrade over time. McMurray, Magnetic lock and wrench, U.S. Pat. No. 3,840,041A. There are also various schemes for preventing access to the operating nut of a fire hydrant, such as by covering the nut with a sprinkler cap control lock. Sigelaksis, Fire hydrant locking sprinkler cap, hydrant valve seals and lubrication access, U.S. Pat. No. 9,108,076B2. Padlocks have been used for fire hydrant security, generally by securing such operating nut coverings in place. Hackley, et al., Fire hydrant locking device, U.S. Pat. No. 6,994,106B1; Fleury, et al., Hydrant security device, U.S. U.S. Pat. No. 6,691,732B2.

SUMMARY OF THE INVENTION

A locking wrench to secure a fire hydrant, thereby preventing tampering, is disclosed. The wrench can be two-ended, with both ends formed in a loop, where either loop can have an interior shape capable of receiving an actuating nut of a fire hydrant. A loop of one end of the wrench can circumscribe the actuating nut when the wrench is in locking mode, and the loop of the other end can be used to turn the actuating nut to either open or close the main valve of the fire hydrant when the wrench has been removed from its locking mode. When the wrench is in locking mode, the wrench can be secured to the fire hydrant by means of an eye bolt that is mounted onto the side of the fire hydrant and inserted into a slot in the handle of the wrench, with a padlock locking arm passing through the eye bolt. The shape of the wrench can be styled to match the curvature of the side of the fire hydrant. Other fittings that are on the fire hydrant, such as water outlet caps and nozzles that are used with hoses or pipes that attach to the fire hydrant can be designed in such a way that the wrench can conveniently adjust them.

In certain embodiments of the present invention, then, a wrench for securing and actuating a fire hydrant can comprise an elongated handle, the handle including a rectangular slot located in a nonterminal portion of the handle, and a planar loop formed at either end of the handle, the loops being continuous with the handle, each loop featuring an opening having a pentagonal shape formed radially about a central axis, the central axes of the loops being nonparallel with respect to each other.

In certain embodiments, in order to avoid protrusion of the wrench in locking mode such that passersby are affected, the central axes of the two loops can be perpendicular to each other.

In certain embodiments, in order to shape the handle of the wrench in a way that is practical for its intended use, the slot in the handle can be oriented such that a plane defined by the two central axes aligns with a long dimension of the slot.

In certain embodiments, because the top portions of some fire hydrants feature a relatively narrow cylindrical neck of constant diameter, the neck having a wider, flanged top through which the actuating nut protrudes, the wrench in locking mode may conform better to the shape of the fire hydrant and be more secure if a portion of the handle including the slot is not in line with adjacent portions of the handle (i.e., it is offset relative to the rest of the wrench handle).

In other embodiments, a portion of the handle including the slot can be in line with adjacent portions of the handle. These embodiments might be better suited for fire hydrants having a constant diameter tubular top and only a simple right angle turn along the hydrant surface from the side to the top, where the actuating nut is.

In certain embodiments of the above described wrench of the present invention in locking mode, one pentagonal opening can receive an actuating nut of the fire hydrant, the fire hydrant bearing an eye bolt protruding from an exterior surface, and the eye bolt can pass through the slot. A padlock can pass through the eye bolt, securing the wrench to the fire hydrant.

In some embodiments, further to avoid protrusion of the wrench when it is in locking mode such that passersby are affected, a shape of the handle can match a shape of a portion of an exterior surface of the fire hydrant. In embodiments, the shape of the portion of the exterior surface of the fire hydrant can be curved.

The wrench of the present invention can perform the dual roles of securing the actuating nut of the fire hydrant when in locking mode and being configured to actuate the fire hydrant when it is removed from the storage position that it occupies in locking mode.

In some embodiments, the fire hydrant can include at least one water outlet, the at least one water outlet being secured by at least one cap, the at least one water outlet corresponding to at least one nozzle that is capable of being placed in fluid communication with and attenuating the water flow from the at least one water outlet, the wrench being configured for any of operating the actuating nut, removing or replacing the at least one cap and regulating water flow from the at least one nozzle.

In certain embodiments, the wrench of the present invention can be oriented with a long dimension parallel to a direction of elongation of the handle.

Some embodiments of the present invention can include a method for securing a fire hydrant from tampering, the method comprising providing a fire hydrant, the fire hydrant including an actuating nut that is exposed to an exterior of the fire hydrant and an eye bolt protruding from an exterior surface of the fire hydrant, providing a two-ended wrench, the ends of the wrench being separated by an elongated handle, each end including an opening having an interior shape that is designed to receive the actuating nut along a central axis, the handle including a slot in a nonterminal location, providing a padlock, fitting one end of the wrench to the actuating nut, inserting the eye bolt into and through the slot, passing a locking arm of the padlock through the eye bolt, and securing the padlock in its locked position.

In some embodiments of this method, the central axes of the openings of the two wrench ends can be oriented perpendicular to each other.

In some embodiments of this method, the slot can be located in a region of the handle that is offset in relation to adjacent portions of the handle.

In some embodiments of this method, a shape of the handle can match a shape of a portion of an exterior surface of the fire hydrant. In some embodiments, the shape of the portion of the exterior surface of the fire hydrant can be curved.

Some embodiments of the present invention can include a system for ensuring fire hydrant security, the system comprising at least one fire hydrant, the at least one fire hydrant including an actuating nut that is exposed to an exterior of the fire hydrant, a plurality of water outlets and a plurality of caps, where a cap fits to each water outlet, each cap including an operating nut, at least one nozzle, an interior of the at least one nozzle being capable of being placed in fluid communication with a respective water outlet, the at least one nozzle including a respective operating nut, a wrench that includes an elongated handle, the handle separating two terminal loops, each terminal loop enclosing an opening that is capable of receiving and fitting to the actuating nut, any of the operating nuts of the caps, or the operating nut(s) of the nozzle(s), and a locking device securing the wrench to the fire hydrant when one terminal loop of the wrench is fitted to the actuating nut.

In some embodiments of the above system, the fire hydrant can further include an eye bolt protruding from an exterior surface of the fire hydrant, the handle of the wrench can include a slot, the slot being capable of receiving the eye bolt, the locking device comprising a padlock, the padlock being capable of securing the fire hydrant by insertion of a padlock locking arm through the slot, one loop of the wrench having received the actuating nut and the slot having received the eye bolt.

In some embodiments of the above described system, the locking device can comprise a clamp enclosing the wrench and an upper barrel of the fire hydrant.

In some embodiments of the above described system, the openings of the terminal loops of the wrench can be pentagonal and capable of receiving and fitting to pentagonal shapes of the actuating nut, the operating nuts of the caps and the operating nut(s) of the nozzle(s).

In some embodiments of the above described system, the openings of the terminal loops of the wrench can be square and capable of receiving and fitting to square shapes of the actuating nut, the operating nuts of the caps and the operating nut(s) of the nozzle(s).

In some embodiments, a shape of the handle of the wrench can match an exterior contour of the fire hydrant. In some embodiments, the exterior contour of the fire hydrant can be curved.

BRIEF DESCRIPTION OF THE DRAWINGS

The above and other features and advantages of the present invention will be made more apparent by describing in detail embodiments thereof with reference to the attached drawings in which.

DETAILED DESCRIPTION OF THE INVENTION

Figure 1:
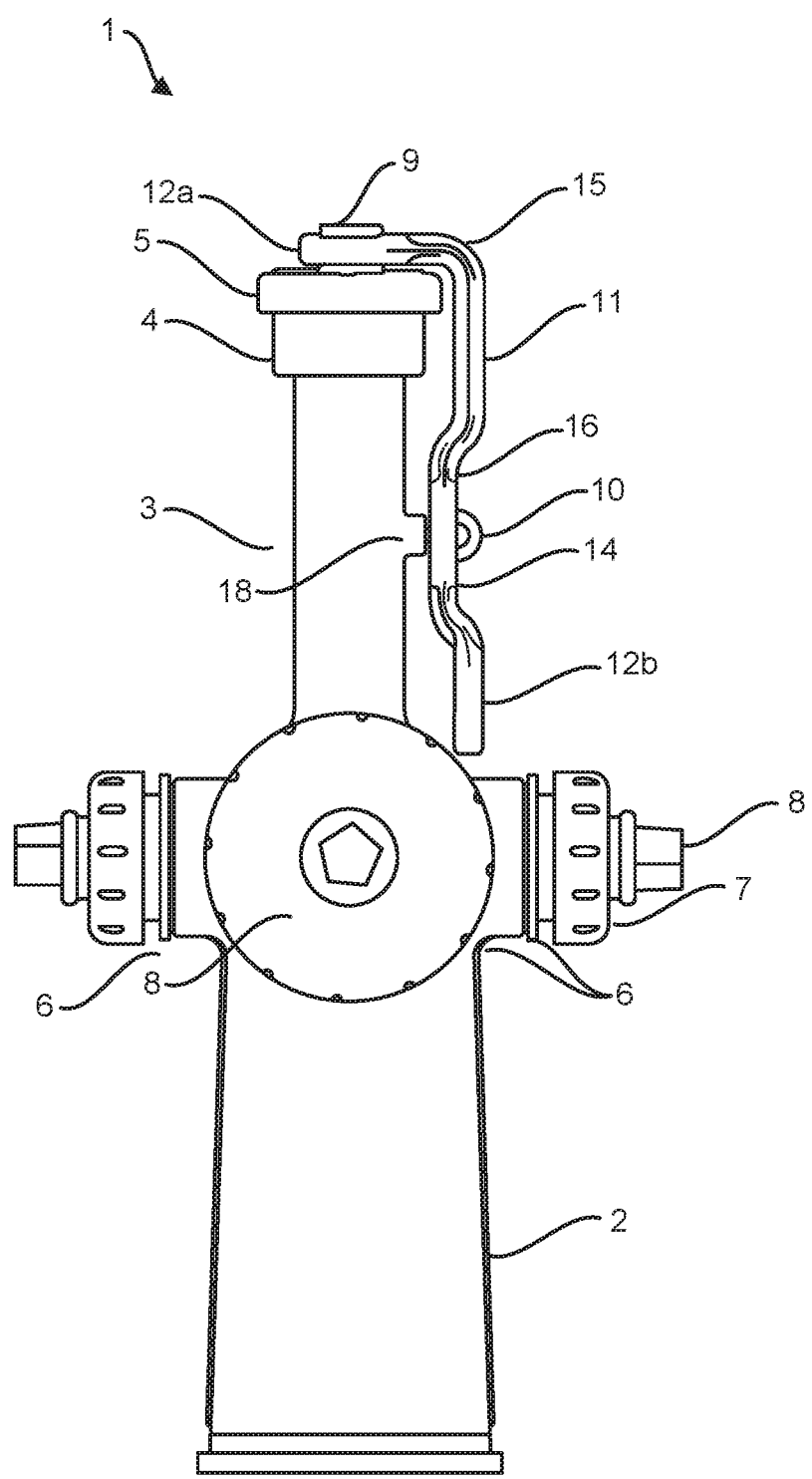
FIG. 1 shows a front view of a contemporary fire hydrant fitted with an embodiment of the wrench of the present invention in locking mode.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The drawings and description are to be regarded as illustrative and non-limiting in nature. The following description is, therefore, merely exemplary. Like reference numerals designate like elements throughout the specification.

When an element or layer is referred to herein as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In view of the serious and important need to discourage tampering with fire hydrants and the fact that many hydrants are unprotected, the present disclosure provides for a simple protection apparatus and method that can be used on existing fire hydrants with minimal or no modification of the hydrants, or on new fire hydrants with minimal or no modification of existing fire hydrant designs. The many prior art methods involving special tools often introduce excessive complexity to the fire hydrant design and require that firefighters always have the special tool at the ready. Reliance on magnetic parts or power supplies requires frequent maintenance attention. Even some of the simpler schemes involving preventing access to the fire hydrant actuating nut by covering it and locking the cover in place require that unnecessary (in light of the present invention) and nonfunctional additional parts be provided.

Figure 2:
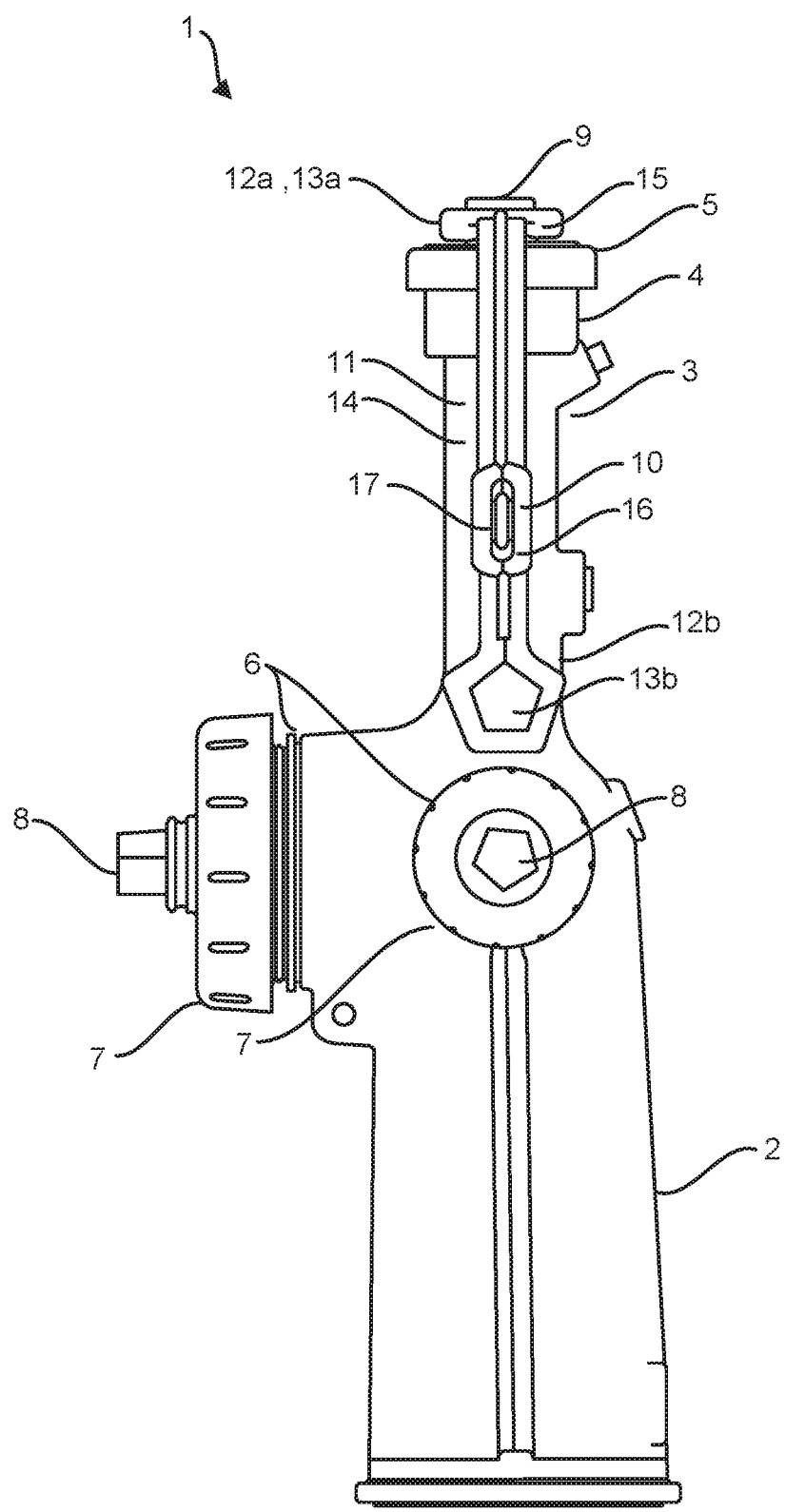
FIG. 2 shows a side view of a contemporary fire hydrant fitted with an embodiment of the wrench of the present invention in locking mode.
Figure 3:
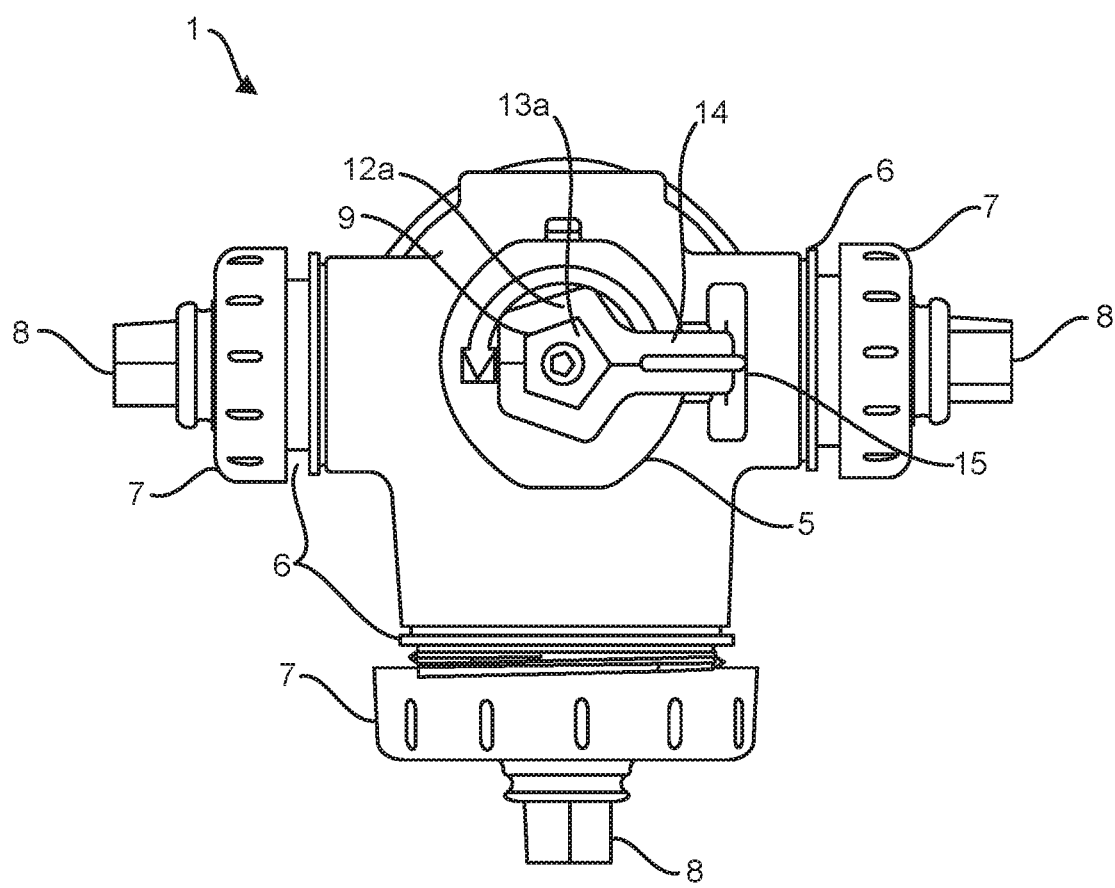
FIG. 3 shows a top view of a contemporary fire hydrant fitted with an embodiment of the wrench of the present invention in locking mode.
Figure 4:
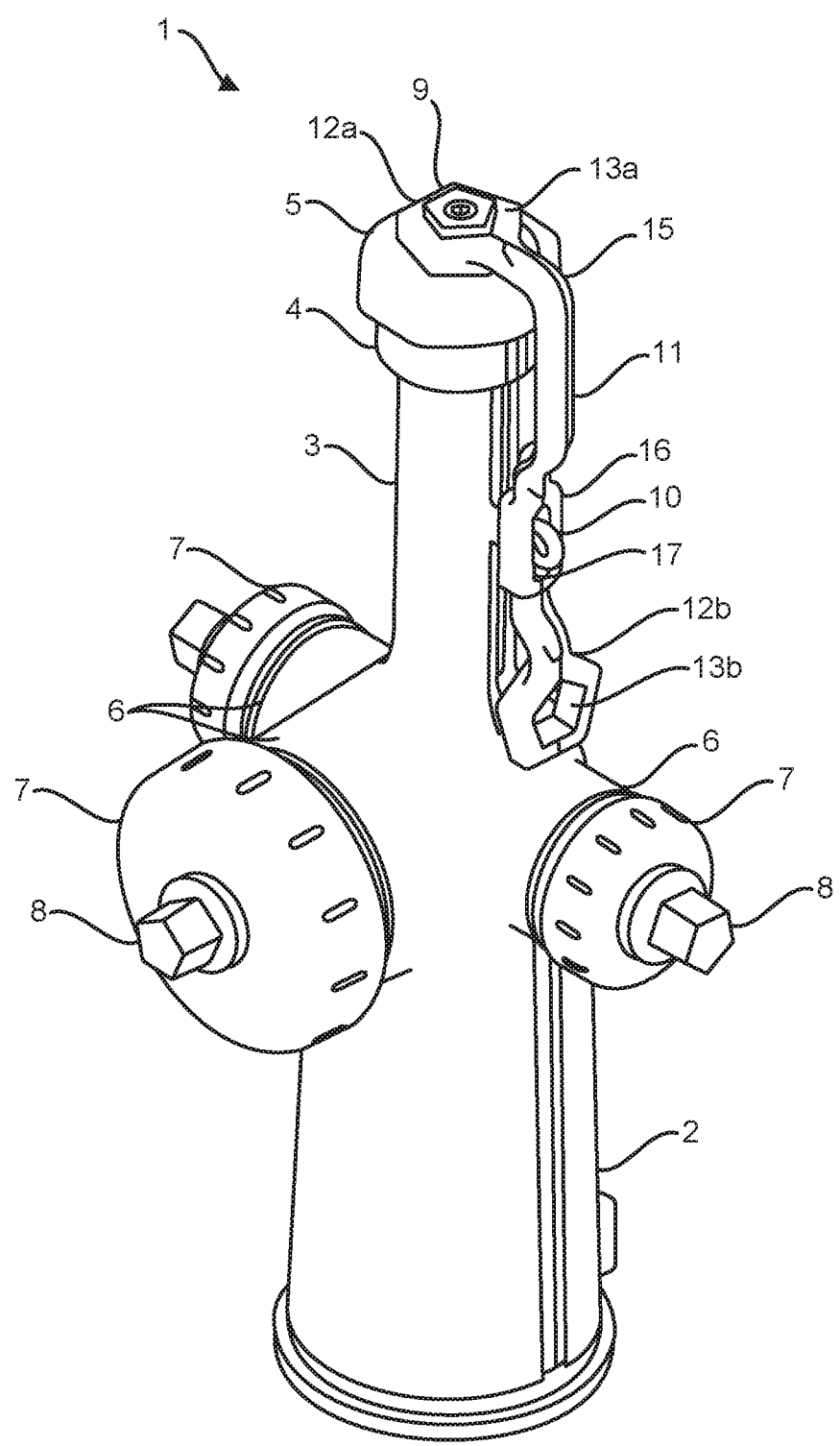
FIG. 4 shows an oblique view of a contemporary fire hydrant fitted with an embodiment of the wrench of the present invention in locking mode.

FIGS. 1-4 show a contemporary fire hydrant that is improved in shape and weight relative to commonly known fire hydrants, and is described in detail in pending application Ser. No. 15/934,005. This fire hydrant is merely exemplary, and the inventive locking wrench can be designed to be used with conventional fire hydrants of various designs and shapes. Referring to FIGS. 1-4, fire hydrant 1 includes a lower barrel 2, a narrower and cylindrical upper barrel 3, a flange 4 and upper barrel cap 5 at the top of the upper barrel, various water outlets 6 and water outlet caps 7. The water outlet caps can be removed and replaced by means of water outlet cap nuts 8. At the top of fire hydrant 1, an actuating nut 9 provides means for turning an internal operating stem (not shown), which opens and closes a main valve (not shown). The main valve can be located within an underground portion of fire hydrant 1 and can interface with a water supply system. An eye bolt 10 can be affixed to an external side portion of upper barrel 3.

Exemplary inventive locking wrench 11, shown in locking mode in FIGS. 1-4, includes loops 12a and 12b enclosing pentagonal openings 13a and 13b at either end of elongated handle 14. Pentagonal opening 13a receives actuating nut 9 when wrench 11 is in locking mode. When fire hydrant 1 is to be operated, wrench 11 is removed from its locking mode position, and pentagonal opening 13b can receive and actuate actuating nut 9 and can also fit and turn water outlet cap nuts 8 and adjusting nuts on accessory nozzles (not shown). Elongated handle 14 can include a bend 15 that can be a right angle bend as shown and can allow the wrench in locking mode to parallel a vertical contour of an exterior side of fully assembled fire hydrant 1. Elongated handle 14 can further include an offset portion 16 that includes a slot 17 for receiving eye bolt 10 when locking wrench 11 is in locking mode. Thus, the shape of wrench 11 accommodates flange 4 and upper barrel cap 5 while eliminating the need for a longer and more vulnerable stem 18 on eye bolt 10, and minimizing the space added to the profile of the hydrant by the locking wrench 11.

The present invention addresses the above-described problems, namely the threat of fire hydrant tampering and the need for special tools or special maintenance in prior art fire hydrant protection schemes, in a simple and convenient way. Modification of an existing fire hydrant necessary to use the inventive method can be limited to mounting an eye bolt on a side of the fire hydrant. Other means of securing the inventive fire hydrant wrench to a fire hydrant, such as a locking clamp encompassing an upper barrel of the fire hydrant and the locking wrench, can be used and would require no modification of the fire hydrant at all. The only other added part, the wrench, is useful in firefighting efforts. The subject locking wrench, which can be manufactured to correspond to a particular shape of the fire hydrant, can lock in place with a padlock. For many existing and newly designed fire hydrants, if the wrench is lost in the confusion of an emergency, the fire hydrant is still operable with commonly available tools.

The security aspect of the present invention can be entrusted to a padlock. Padlocks are designed by security professionals with security in mind. Simpler, cheaper padlocks can be replaced with more secure and/or stronger padlocks as the need arises. Padlocks for a municipality can be made to work with a common key; the common key can be changed not at all or with a frequency tailored to the needs of the community. Padlocks can be combination type or key type padlocks, but they are not limited thereto. Padlock keys are less likely to be lost or unavailable when needed than are special tools that must be stored apart from the firefighter's person, and if one firefighter loses the key, all others would be likely to have it.

The embodiment illustrated in FIGS. 1-4 is merely exemplary, and the present invention is intended to encompass other possible shapes for the nuts and the corresponding wrench, including but not limited to square, hexagonal and 12 point or other universal box-ended wrenches. The inventive wrench can be open-ended, closed-ended, or box-ended and can be a socket wrench, an alligator wrench, a Saltus wrench, a spanner wrench, a self-adjusting wrench, and/or a ratcheting wrench, but is not limited thereto. The two ends of the inventive wrench can be of the same or different design. Wrenches and nuts can be of any suitable dimensions and are not limited to any particular standard dimension.

The inventive wrench can be made from any suitable material, such as a chromium-vanadium alloy steel, which can be beneficial for its strength and corrosion and abrasion resistance. Molybdenum steel alloys, vanadium high-carbon steel alloys, high carbon-chromium steels, high-speed tool steels (HSS), tungsten carbide, titanium alloys, certain plastic composite materials such as glass fiber reinforced plastics, or high carbon steel can, for example, also be used. Injection molded plastics such as polyvinyl chloride (PVC), acrylonitrile butadiene styrene (ABS), acetal copolymers reinforced with either carbon or glass fibers, or Minlon reinforced nylon resin or similar materials might be suitable in some embodiments. The inventive wrench, if comprised of a metal or metal alloy, can, for example, be made using a drop-forged manufacturing technique. In embodiments, the inventive wrench can be plated with chromium or another suitable material to impart or increase corrosion resistance and to facilitate cleaning.

Additionally, the present invention is intended to encompass alternative schemes for releasably holding the inventive wrench in its locking position. For example, a notch or groove in the fire hydrant upper flange or upper barrel in combination with a locking metal band, clamp, or chain that surrounds the upper barrel and secures the offset portion of the wrench handle would obviate the need for an eye bolt. As another example, the eye bolt could be positioned to pass through the opening labeled 13b in FIG. 1 and be fitted with a padlock too large to fit through the opening, obviating the need for a slot in the wrench handle.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for securing a fire hydrant from tampering, the method comprising:
   providing a fire hydrant, the fire hydrant including:
      an upper barrel having a body with a lower body portion and an upper body portion, the upper body portion having an outer diameter, a circumferential outer surface, and an upper end;
      an upper barrel cap on the upper end of the upper body portion, the upper barrel cap having an outer diameter greater than the outer diameter of the upper body portion;
      an actuating nut exposed to an exterior of the fire hydrant at the upper barrel cap;
      an eye bolt protruding from the upper body portion;
      a fluid outlet extending from the body at a union of the lower body portion and the upper body portion; and
      a cap configured to fit to the fluid outlet, the cap including an operating nut; and
   providing a wrench including:
      an elongated handle including a first portion with a slot, a second portion connected to the first portion by a bend, the second portion parallel to the first portion, the first portion nonaligned with the second portion, the bend bent toward the upper barrel from the second portion to the first portion;
      a first terminal loop enclosing a first opening and having a first center axis; and
      a second terminal loop enclosing a second opening and having a second center axis, the second terminal loop being separated from the first terminal loop by the elongated handle,
      the first terminal loop configured to receive and fit to at least one of the actuating nut and the operating nut, the second terminal loop configured to receive and fit to at least the other of the actuating nut and the operating nut,
      the first terminal loop and the second terminal loop being continuous with the handle, the first opening having a pentagonal shape formed radially about the first center axis, the second opening having a pentagonal shape formed radially about the second center axis, the first center axis and the second center axis being nonparallel with respect to each other;
   providing a locking device having a locking arm, a locked position, and an unlocked position;
   fitting one end of the wrench to the actuating nut; and
   inserting the eye bolt into and through the slot.

2. The method of claim 1, wherein the first center axis and the second center axis are oriented perpendicular to each other.

3. The method of claim 1, wherein the elongated handle includes a third portion connected to the first portion by a second bend, the first portion being between the second portion and the third portion, the first potion nonaligned with the third portion.

4. The method of claim 1, further comprising:
   passing the locking arm of the locking device through the eye bolt; and
   securing the locking device in the locked position.

5. The method of claim 1, further comprising positioning the first portion closer to the upper body portion of the fire hydrant than the second portion.

6. The method of claim 1, wherein the second portion terminates at the first terminal loop.

7. A fire hydrant assembly, comprising:
   a fire hydrant, the fire hydrant including:
      an upper barrel having a body with a lower body portion and an upper body portion, the upper body portion having an outer diameter, a circumferential outer surface, and an upper end;
      an upper barrel cap on the upper end of the upper body portion, the upper barrel cap having an outer diameter greater than the outer diameter of the upper body portion;
      an actuating nut exposed to an exterior of the fire hydrant at the upper barrel cap;
      a fluid outlet extending from the body at a union of the lower body portion and the upper body portion; and
      an eye bolt extending from an exterior surface of the upper body portion; and
      an outlet cap configured to fit to the fluid outlet, the outlet cap including an operating nut; and
   a wrench including:
      an elongated handle including a first portion with a slot, a second portion connected to the first portion by a bend, the second portion parallel to the first portion, the first portion nonaligned with the second portion, the bend bent toward the upper barrel from the second portion to the first portion;
      a first terminal loop enclosing a first opening and having a first center axis; and
      a second terminal loop enclosing a second opening and having a second center axis, the second terminal loop being separated from the first terminal loop by the handle,
      the first terminal loop configured to receive and fit to at least one of the actuating nut and the operating nut, the second terminal loop configured to receive and fit to at least the other of the actuating nut and the operating nut,
   the first terminal loop and the second terminal loop being continuous with the handle, the first opening being formed about the first center axis, the second opening being formed about the second center axis, the first center axis and the second center axis being nonparallel with respect to each other.

8. The fire hydrant assembly of claim 7, wherein the openings of the first and second terminal loops of the wrench are each pentagonal and configured to receive and fit to pentagonal shapes of the actuating nut or the operating nut.

9. The fire hydrant assembly of claim 7, wherein the openings of the terminal loops of the wrench are square and configured to receive and fit to square shapes of the actuating nut or the operating nut.

10. The fire hydrant assembly of claim 7, further comprising a locking device configured to secure the wrench to the fire hydrant when one of the first terminal loop and the second terminal loop is fitted to the actuating nut and the eyebolt is inserted through the slot, the locking device having a locking arm configured to be inserted through the eyebolt.

11. The fire hydrant assembly of claim 10, wherein the locking device comprises a padlock.

12. The fire hydrant assembly of claim 7, wherein the first portion of the handle is parallel with the second portion of the handle.

13. The fire hydrant assembly of claim 7, wherein the elongated handle includes a third portion connected to the second portion by a second bend, and wherein the third portion terminates at the first terminal loop.

14. The fire hydrant assembly of claim 10, wherein the locking device comprises a clamp enclosing the wrench and an upper barrel of the fire hydrant.

15. The fire hydrant assembly of claim 7, wherein the first portion is positioned closer to the upper body portion of the fire hydrant than the second portion.

16. The fire hydrant assembly of claim 7, wherein the second portion terminates at the first terminal loop.

* * * * *